(12) United States Patent
Wagoner et al.

(10) Patent No.: US 10,243,352 B2
(45) Date of Patent: Mar. 26, 2019

(54) BATTERY-SUPPORTED BRAKING SYSTEM FOR A WIND TURBINE

(71) Applicant: General Electric Company, Schenectady, NY (US)

(72) Inventors: Robert Gregory Wagoner, Roanoke, VA (US); Govardhan Ganireddy, Bangalore (IN); Yashomani Kolhatkar, Bangalore (IN)

(73) Assignee: General Electric Company, Schenectady, NY (US)

( * ) Notice: Subject to any disclaimer, the term of this patent is extended or adjusted under 35 U.S.C. 154(b) by 244 days.

(21) Appl. No.: 15/223,053

(22) Filed: Jul. 29, 2016

(65) Prior Publication Data

US 2018/0034264 A1 Feb. 1, 2018

(51) Int. Cl.
*H02H 7/06* (2006.01)
*F03D 7/02* (2006.01)
(Continued)

(52) U.S. Cl.
CPC ........... *H02H 7/067* (2013.01); *F03D 7/0244* (2013.01); *H02H 7/1216* (2013.01); *H02P 9/007* (2013.01);
(Continued)

(58) Field of Classification Search
CPC ...... H02H 7/067; H02H 7/1216; F03D 9/003; H02P 9/102
See application file for complete search history.

(56) References Cited

U.S. PATENT DOCUMENTS

| | | | |
|---|---|---|---|
| 8,866,340 B2* | 10/2014 | Alam | H02J 3/32 307/60 |
| 9,334,749 B2* | 5/2016 | Das | F01D 15/10 |

(Continued)

FOREIGN PATENT DOCUMENTS

| | | |
|---|---|---|
| CN | 105429535 A | 3/2016 |
| EP | 1 863 162 A2 | 12/2007 |

(Continued)

OTHER PUBLICATIONS

Extended European Search Report and Opinion issued in connection with corresponding EP Application No. 17181060.9 dated Dec. 11, 2017.

(Continued)

*Primary Examiner* — Jared Fureman
*Assistant Examiner* — Michael Warmflash
(74) *Attorney, Agent, or Firm* — Dority & Manning, P.A.

(57) ABSTRACT

The present disclosure is directed to a protection system for a wind turbine power system connected to a power grid. The protection system includes a main brake circuit having at least one brake resistive element and at least one brake switch element, a battery system, and a controller. The brake resistive element is coupled to at least one of a DC link of a power converter of the wind turbine power system, windings of a rotor of the generator, or windings of a stator of a generator of the wind turbine power system via the brake switch element. The battery system is coupled to the generator via a battery switch element. In addition, the controller is configured to disconnect the power converter and the generator from the power grid and connect at least one of the main brake circuit or the battery system to the generator in response to detecting an electromagnetic (EM) torque loss event so as to generate an EM torque.

20 Claims, 8 Drawing Sheets

(51) Int. Cl.
*H02P 9/00* (2006.01)
*H02P 9/10* (2006.01)
*H02H 7/12* (2006.01)

(52) U.S. Cl.
CPC ........ *H02P 9/102* (2013.01); *F05B 2260/845* (2013.01)

(56) References Cited

U.S. PATENT DOCUMENTS

| | | | |
|---|---|---|---|
| 9,577,557 B2* | 2/2017 | Bala | F01D 15/10 |
| 2007/0216164 A1* | 9/2007 | Rivas | F03D 7/0224 |
| | | | 290/44 |
| 2007/0228836 A1* | 10/2007 | Teichmann | H02J 7/34 |
| | | | 307/80 |
| 2010/0292852 A1* | 11/2010 | Gertmar | H02J 3/1842 |
| | | | 700/287 |
| 2011/0187108 A1* | 8/2011 | Wakasa | F03D 7/0224 |
| | | | 290/44 |
| 2012/0280569 A1 | 11/2012 | Alam et al. | |
| 2013/0334818 A1* | 12/2013 | Mashal | F03D 7/0264 |
| | | | 290/44 |
| 2014/0225369 A1* | 8/2014 | Bodewes | F03D 7/04 |
| | | | 290/44 |
| 2015/0008673 A1* | 1/2015 | Damen | F03D 7/0264 |
| | | | 290/44 |

FOREIGN PATENT DOCUMENTS

| | | | |
|---|---|---|---|
| EP | 1863162 A2 * | 12/2007 | ........... F03D 7/0248 |
| EP | 3 032 684 A1 | 6/2016 | |
| WO | 2007/072007 A1 | 6/2007 | |
| WO | 2007/140466 A2 | 12/2007 | |

OTHER PUBLICATIONS

Chinese Patent Application 2015/10567165.1 Filed on Sep. 8, 2015.
Chinese Patent Application 2015/10567491.2 Filed on Sep. 8, 2015.

* cited by examiner

BATTERY-SUPPORTED BRAKING SYSTEM FOR A WIND TURBINE

FIELD OF THE INVENTION

The present disclosures relates generally to wind turbines and, more particularly, to a to battery-supported braking system and a method of operating same.

BACKGROUND OF THE INVENTION

Wind power is considered one of the cleanest, most environmentally friendly energy sources presently available, and wind turbines have gained increased attention in this regard. A modern wind turbine typically includes a tower, a generator, a gearbox, a nacelle mounted on the tower, and a rotor coupled to the nacelle. The rotor typically includes a rotatable hub and a plurality of rotor blades coupled to and extending outwardly from the hub. The rotor blades capture kinetic energy of wind using known airfoil principles. More specifically, the rotor blades transmit the kinetic energy in the form of rotational energy so as to turn a shaft coupling the rotor blades to the gearbox, or if the gearbox is not used, directly to the generator. The generator then converts the mechanical energy to electrical energy that may be deployed to a power grid.

In a wind turbine generator, such as a doubly fed induction generator (DFIG), a stator is directly connected to the power grid, and a rotor is connected to the power grid via an AC-DC-AC power converter. When the generator is in the power generating mode, an electromagnetic (EM) torque of the generator is controlled by a controller to match a mechanical torque of the wind turbine. If a sudden grid loss event or failure of the converter occurs, the converter loses the ability to control the EM torque, and the EM torque is reduced to zero within 100-200 milliseconds. In contrast, it takes tens of seconds to a couple of minutes for the mechanical torque to reduce to zero when the mechanical torque is reduced only by mechanical operation of pitching out blades of the wind turbine. Due to the sudden loss of EM torque and the slow decaying of the mechanical torque, the rotor may be accelerated to exceed a rated speed even when the blades of the wind turbine are pitched out at the fastest rate feasible. The acceleration of the rotor combined with the loss of aerodynamic thrust due to fast pitching of blades results in high loading on the turbine mechanical structure, especially on the tower, blades, and hub. Therefore, the need to withstand the sudden EM torque loss event usually drives the design of most of wind turbine components.

Large rotors continue to be the most dominant trend in wind industry in recent years as they drive attractive project economics. But, larger rotors, with the heavier mass and higher inertia, lead to increased loads on the turbine mechanical and structural components. It is observed that the maximum loading on the turbine mechanical components is determined by how well the rotor over speeding is controlled during a shut-down event in response to extreme fault of sudden loss of counter torque. As such, for some systems, a mechanical brake is placed on the high-speed shaft to reduce the rotor over speeding. However, the mechanical braking system has certain drawbacks such as sub-rated brake torque (~0.5 pu), slower kick-in time (3-4 seconds), as well as wear and tear of its components.

Thus, enhanced braking capability combined with the existing mechanical brake system, could help the wind turbine better manage the loads during the extreme events. In addition, in an effort to provide a smoother turbine shutdown, some modern systems employ a 10-second torque buffer; however, such systems assume converter availability. Thus, there is a need for an improved braking system that addresses the aforementioned issues.

BRIEF DESCRIPTION OF THE INVENTION

Aspects and advantages of the invention will be set forth in part in the following description, or may be obvious from the description, or may be learned through practice of the invention.

In one aspect, the present disclosure is directed to a protection system for a wind turbine power system connected to a power grid. The wind turbine power system generally includes a generator with a stator and a rotor and a power converter having a rotor-side converter, a grid-side converter, and a DC link configured therebetween. As such, the protection system includes a main brake circuit, a battery system, and a controller. The main brake circuit has at least one brake resistive element and at least one brake switch element. Further, the brake resistive element is coupled to the DC link of the power converter or to windings of the stator or rotor of the generator via the brake switch element. Moreover, the battery system is coupled to the generator via a battery switch element. Thus, the controller is configured to disconnect the power converter and the generator from the power grid and connect at least one of the main brake circuit or the battery system to the generator in response to detecting an electromagnetic (EM) torque loss event so as to generate an EM torque.

In one embodiment, the protection system further includes a first switch element coupled between the power converter and the generator and the power grid. In such an embodiment, the controller is configured to disconnect the power converter and the generator from the power grid via the first switch element.

In another embodiment, the EM torque loss event may include a grid loss, a power system trip, and/or a turbine internal fault. Thus, in such embodiments, the controller may be configured to determine whether the power system trip or fault is critical or non-critical. In other words, a critical power system trip or fault generally corresponds to the power converter being unavailable to use for braking, whereas a non-critical power system trip or fault generally corresponds to the power converter being available to use for braking. In certain instances, critical trips/faults may include rotor IGBT failure, DC link failure, DC link discharged, or control cards. Further, non-critical trips/faults may include any other trips/faults where the converter components are healthy or operable, such as trips due to grid transients.

As such, in certain embodiments, if the power converter is available, the controller is configured to control the brake switch element of the main brake circuit and the power converter so as to connect the brake resistive element to the generator to generate the EM torque. In further embodiments, if the power converter is unavailable, the controller is configured to control the battery switch element of the battery system so as to connect the battery resistive element to the generator to generate the EM torque.

In additional embodiments, the main brake circuit of the protection system may further include a storage element. In such embodiments, the controller may be configured to control the brake switch element so as to connect at least one of the brake resistive element or the storage element to the DC link in response to the EM torque loss event. In yet another embodiment, the brake switch element may include a first DC chopper coupled to the storage element and the DC link and a second DC chopper coupled to the resistive element and the DC link.

In further embodiments, the protection system may also include a second switch element. In such an embodiment, the controller may be configured to control the second switch element so as to decouple the windings of the stator from the grid-side converter and couple the brake resistive element or the battery resistive element to the windings of the stator in response to the EM torque loss event control.

In another aspect, the present disclosure is directed to a method for protecting a wind turbine power system connected to a power grid. The wind turbine power system generally includes a generator with a stator and a rotor and a power converter having a rotor-side converter, a grid-side converter, and a DC link configured therebetween. As such, the method includes monitoring, via one or more sensors, one or more operating conditions of the power grid. The method also includes determining, via a controller, whether an electromagnetic (EM) torque loss event is occurring in the power grid based on the one or more operating conditions. In response to detecting the EM torque loss event, the method also includes disconnecting the power converter and the generator from the power grid. Further, the method includes connecting a main brake circuit and a battery system to the generator so as to generate an EM torque and generating the EM torque via at least one of the main brake circuit and the battery system. It should be understood that the method may further includes any of the additional steps and/or features as described herein.

In yet another aspect, the present disclosure is directed to a method for protecting a wind turbine power system connected to a power grid. The wind turbine power system generally includes a generator with a stator and a rotor and a power converter having a rotor-side converter, a grid-side converter, and a DC link configured therebetween. As such, the method includes monitoring, via one or more sensors, one or more operating conditions of the power grid. The method also includes determining, via a controller, whether an electromagnetic (EM) torque loss event is occurring in the power grid based on the one or more operating conditions. In response to detecting the EM torque loss event, the method also includes disconnecting the power converter and the generator from the power grid. Further, the method includes generating an EM torque via at least one of a main brake circuit or a battery system depending on whether the EM torque loss event is critical or non-critical. It should be understood that the method may further includes any of the additional steps and/or features as described herein.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Unless defined otherwise, technical and scientific terms used herein have the same meaning as is commonly understood by one of ordinary skill in the art to which this disclosure belongs. The terms "first," "second," and the like, as used herein do not denote any order, quantity, or importance, but rather are used to distinguish one element from another. Also, the terms "a" and "an" do not denote a limitation of quantity, but rather denote the presence of at least one of the referenced items. The term "or" is meant to be inclusive and mean either any, several, or all of the listed items. The use of "including," "comprising," or "having" and variations thereof herein are meant to encompass the items listed thereafter and equivalents thereof as well as additional items. The terms "connected" and "coupled" are not restricted to physical or mechanical connections or couplings, and can include electrical connections or couplings, whether direct or indirect. The terms "circuit," "circuitry," and "controller" may include either a single component or a plurality of components, which are either active and/or passive components and may be optionally connected or otherwise coupled together to provide the described function.

Generally, the present disclosure is directed to a protection system for a wind turbine power system connected to a power grid and a method for operating same. More specifically, the protection system generally includes a main brake circuit, a battery system, and a controller. The main brake circuit has at least one brake resistive element and at least one brake switch element. Further, the brake resistive element is coupled to a DC link of the power converter of the wind turbine power system or to windings of a generator stator or a generator rotor of the wind turbine power system via the brake switch element. Moreover, the battery system is coupled to the generator via a battery switch element and includes at least one battery resistive element. As such, the controller is configured to disconnect the power converter and the generator from the power grid and connect at least one of the main brake circuit or the battery system to the generator in response to detecting an electromagnetic (EM) torque loss event so as to generate an EM torque. Thus, the controller can use the main brake circuit, the battery system, or both, depending upon converter availability, to generate EM torque.

Accordingly, the present disclosure provides many advantages not included in the prior art. For example, the system and method of the present disclosure provides a lower-cost turbine since larger components are not required to handle the EM torque events. Further, the system and method of the present disclosure improves reliability of known braking technologies to cover instances of converter unavailability.

Figure 1:
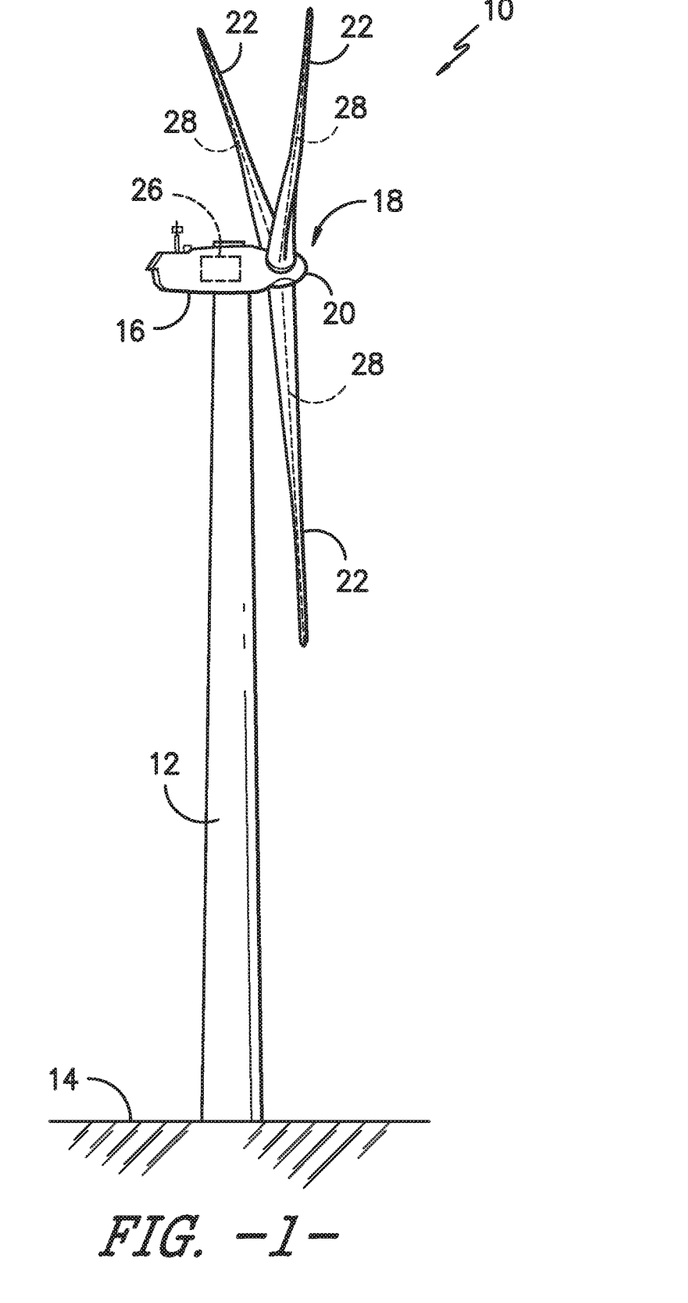
FIG. 1 illustrates a perspective view of one embodiment of a wind turbine according to the present disclosure.

Referring now to the drawings, FIG. 1 illustrates a perspective view of one embodiment of a wind turbine 10. As shown, the wind turbine 10 generally includes a tower 12 extending from a support surface 14, a nacelle 16 mounted on the tower 12, and a rotor 18 coupled to the nacelle 16. The rotor 18 includes a rotatable hub 20 and at least one rotor blade 22 coupled to and extending outwardly from the hub 20. For example, in the illustrated embodiment, the rotor 18 includes three rotor blades 22. However, in an alternative embodiment, the rotor 18 may include more or less than three rotor blades 22. Each rotor blade 22 may be spaced about the hub 20 to facilitate rotating the rotor 18 to enable kinetic energy to be transferred from the wind into usable mechanical energy, and subsequently, electrical energy. For instance, the hub 20 may be rotatably coupled to an electric generator 24 (FIG. 2) positioned within the nacelle 16 to permit electrical energy to be produced.

Figure 2:
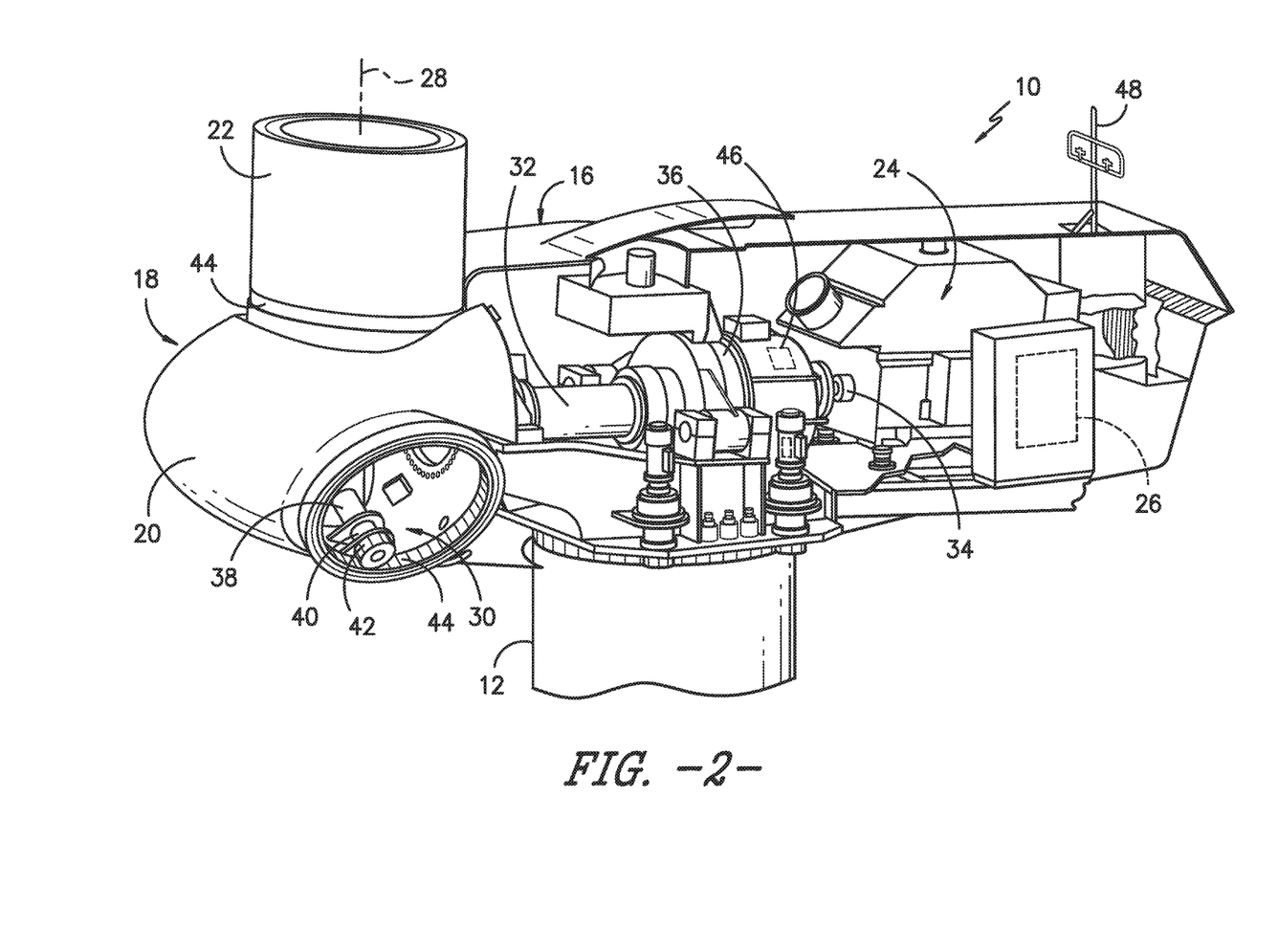
FIG. 2 illustrates a simplified, internal view of one embodiment of a nacelle of a wind turbine according to the present disclosure.

Referring now to FIG. 2, a simplified, internal view of one embodiment of the nacelle 16 of the wind turbine 10 shown in FIG. 1 is illustrated. As shown, a generator 24 may be disposed within the nacelle 16. In general, the generator 24 may be coupled to the rotor 18 for producing electrical power from the rotational energy generated by the rotor 18. For example, as shown in the illustrated embodiment, the rotor 18 may include a rotor shaft 32 coupled to the hub 20 for rotation therewith. The rotor shaft 32 may, in turn, be rotatably coupled to a generator shaft 34 of the generator 24 through a gearbox 36. As is generally understood, the rotor shaft 32 may provide a low speed, high torque input to the gearbox 36 in response to rotation of the rotor blades 22 and the hub 20. The gearbox 36 may then be configured to convert the low speed, high torque input to a high speed, low torque output to drive the generator shaft 34 and, thus, the generator 24.

Additionally, the turbine controller 26 may also be located within the nacelle 16. As is generally understood, the turbine controller 26 may be communicatively coupled to any number of the components of the wind turbine 10 in order to control the operation of such components. For example, as indicated above, the turbine controller 26 may be communicatively coupled to each pitch adjustment mechanism 30 of the wind turbine 10 (one of which is shown) to facilitate rotation of each rotor blade 22 about its pitch axis 28.

In general, each pitch adjustment mechanism 30 may include any suitable components and may have any suitable configuration that allows the pitch adjustment mechanism 30 to function as described herein. For example, in several embodiments, each pitch adjustment mechanism 30 may include a pitch drive motor 38 (e.g., any suitable electric motor), a pitch drive gearbox 40, and a pitch drive pinion 42. In such embodiments, the pitch drive motor 38 may be coupled to the pitch drive gearbox 40 so that the pitch drive motor 38 imparts mechanical force to the pitch drive gearbox 40. Similarly, the pitch drive gearbox 40 may be coupled to the pitch drive pinion 42 for rotation therewith. The pitch drive pinion 42 may, in turn, be in rotational engagement with a pitch bearing 44 coupled between the hub 20 and a corresponding rotor blade 22 such that rotation of the pitch drive pinion 42 causes rotation of the pitch bearing 44. Thus, in such embodiments, rotation of the pitch drive motor 38 drives the pitch drive gearbox 40 and the pitch drive pinion 42, thereby rotating the pitch bearing 44 and the rotor blade 22 about the pitch axis 28.

In alternative embodiments, it should be appreciated that each pitch adjustment mechanism 30 may have any other suitable configuration that facilitates rotation of a rotor blade 22 about its pitch axis 28. For instance, pitch adjustment mechanisms 30 are known that include a hydraulic or pneumatic driven device (e.g., a hydraulic or pneumatic cylinder) configured to transmit rotational energy to the pitch bearing 44, thereby causing the rotor blade 22 to rotate about its pitch axis 28. Thus, in several embodiments, instead of the electric pitch drive motor 38 described above; each pitch adjustment mechanism 30 may include a hydraulic or pneumatic driven device that utilizes fluid pressure to apply torque to the pitch bearing 44.

Referring still to FIG. 2, the wind turbine 10 may also include a plurality of sensors (e.g. such as sensors 46, 48) for monitoring one or more operating parameters and/or wind conditions of the wind turbine 10. As used herein, a parameter or condition of the wind turbine 10 is "monitored" when a sensor is used to determine its present value. Thus, the term "monitor" and variations thereof are used to indicate that the sensors 46, 48 need not provide a direct measurement of the parameter and/or condition being monitored. For example, the sensors 46, 48 may be used to generate signals relating to the parameter and/or condition being monitored, which can then be utilized by the turbine controller 26 or other suitable device to determine the actual parameter and/or condition. More specifically, in certain embodiments, the sensor(s) 46, 48 may be configured to monitor the speed of the rotor 18 and/or the rotor shaft 32, the speed of the generator 24 and/or the generator shaft 34, the torque on the rotor shaft 32 and/or the generator shaft 34, stator and/or rotor voltage or current, the wind speed and/or wind direction, and/or any other suitable operating parameters and/or conditions.

Figure 3:
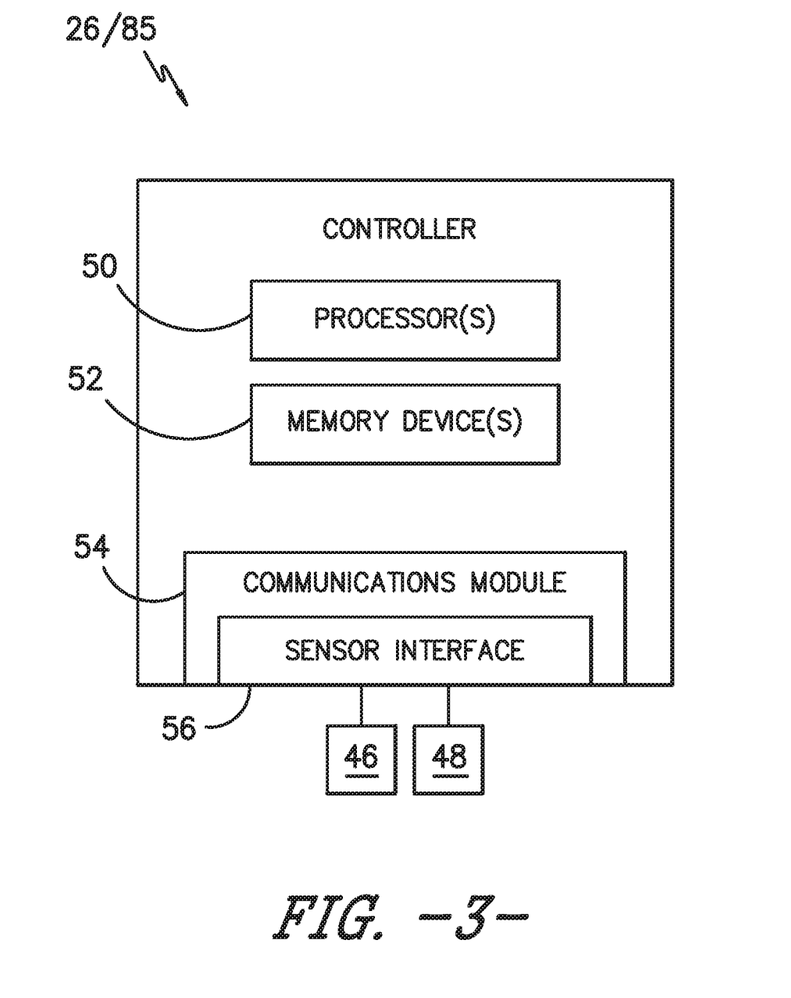
FIG. 3 illustrates a schematic diagram of one embodiment of suitable components that may be included within a turbine controller (or a converter controller) of a wind turbine or a controller of a braking system according to the present disclosure.

Referring now to FIG. 3, there is illustrated a block diagram of one embodiment of suitable components that may be included within the turbine controller 26 (or a converter controller 75) in accordance with aspects of the present disclosure. As shown, the turbine controller 26 may include one or more processor(s) 50 and associated memory device(s) 52 configured to perform a variety of computer-implemented functions (e.g., performing the methods, steps, calculations and the like disclosed herein). As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory device(s) 52 may generally comprise memory element(s) including, but not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory device(s) 52 may generally be configured to store suitable computer-readable instructions that, when implemented by the processor(s) 50, configure the turbine controller 26 to perform various functions including, but not limited to, transmitting suitable control signals to one or more of the wind turbine components, monitoring various parameters and/or conditions of the wind turbine 10 and various other suitable computer-implemented functions.

Additionally, the turbine controller 26 may also include a communications module 54 to facilitate communications between the controller 26 and the various components of the wind turbine 10. For instance, the communications module 54 may serve as an interface to permit the turbine controller 26 to transmit control signals to each pitch adjustment mechanism 30 for controlling the pitch angle of the rotor blades 22. Moreover, the communications module 54 may include a sensor interface 56 (e.g., one or more analog-to-digital converters) to permit signals transmitted from the sensors 46 of the wind turbine 10 to be converted into signals that can be understood and processed by the processors 50. Further, it should be appreciated that the sensor(s) 46, 48 may be communicatively coupled to the communications module 54 using any suitable means. For example, as shown in FIG. 3, the sensors 46, 48 may be coupled to the sensor interface 56 via a wired connection. However, in other embodiments, the sensors 46, 48 may be coupled to the sensor interface 56 via a wireless connection, such as by using any suitable wireless communications protocol known in the art. It should be understood that the converter controller 75 as described herein may include any of the components of the turbine controller 26.

Figure 4:
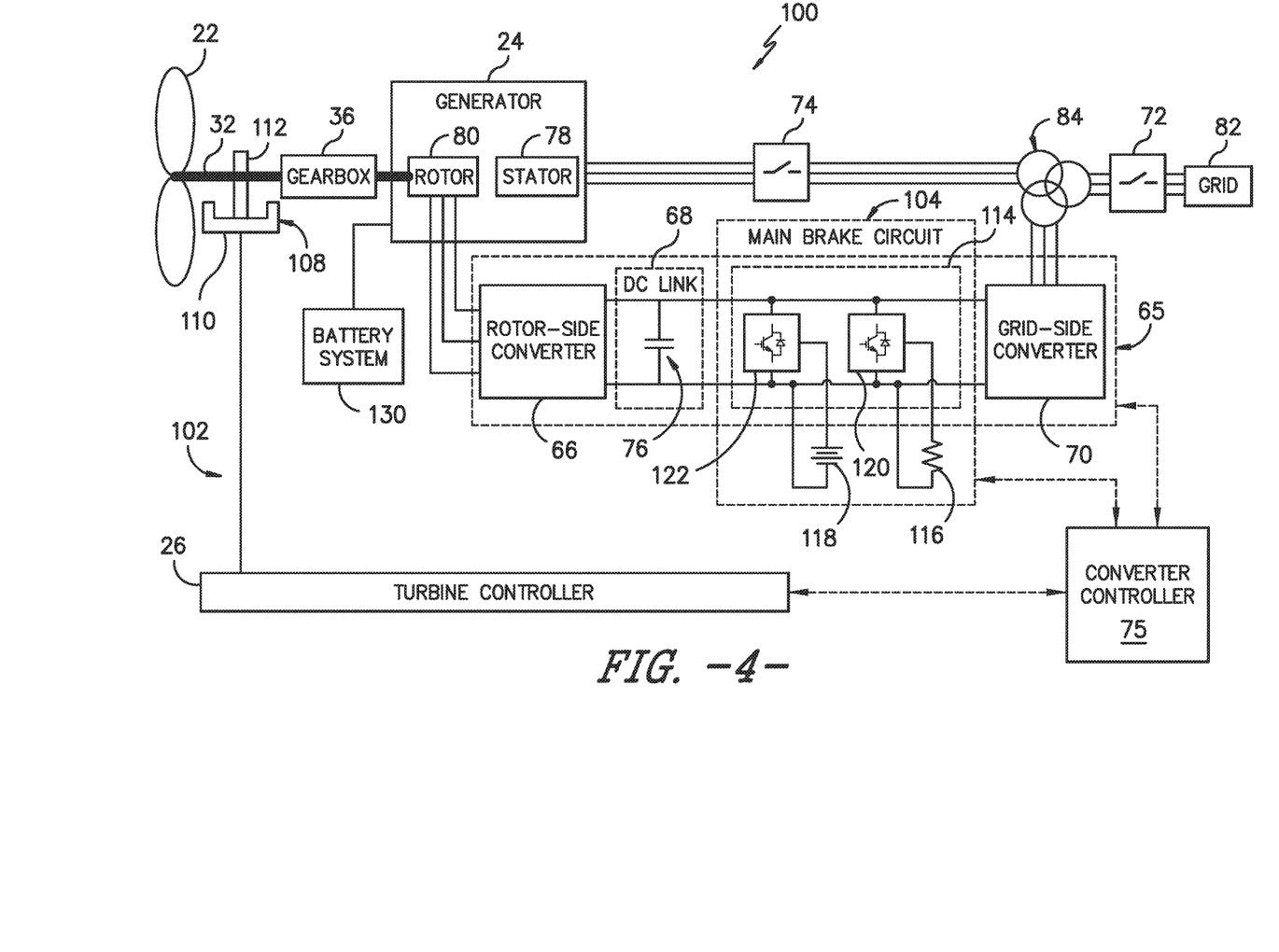
FIG. 4 illustrates a schematic representation of one embodiment of a wind turbine power system, particularly illustrating a braking system according to the present disclosure.

Referring now to FIG. 4, a schematic representation of a wind turbine power system 100 including a braking system 102 according to one embodiment of the present disclosure is illustrated. As mentioned, the wind turbine power system 100 includes a plurality of rotor blades 22 coupled to the main shaft 32. Further, the generator 24 includes a stator 78 and a rotor 80. Thus, the rotor 80 is mechanically coupled to the main shaft 32 via the gearbox 36. Moreover, in certain embodiments, the generator 24 may be a doubly fed induction generator (DFIG). In addition, as shown, the wind turbine power system 100 also includes a power converter 65 having a rotor-side converter 66, a DC link 68, a grid-side converter 70, and a converter controller 75. More specifically, as shown, the DC link 68 of the power converter 65 is coupled between the rotor-side converter 66 and the grid-side converter 70. Further, the DC link 68 may include one or more capacitors 76 for keeping the voltage variation (ripples) in the DC link voltage small. As such, the converter controller 75 is configured to control the various components of the power converter 65, such as the rotor-side converter 66, the DC link 68, and/or the grid-side converter 70. Further, the wind turbine power system 100 also includes first and second switch elements 72, 74. More specifically, in certain embodiments, the first switch element 72 may be an electric fuse or a circuit breaker and the second switch element 74 may be a contactor.

Windings of the stator 78 (hereinafter referred as "stator windings") are coupled to a power grid 82 via the first and second switch 72, 74 as well as a transformer 84. It should be understood that the transformer 84 may include a single three-winding transformer as shown as well as two transformers, with one transformer between the stator 78 and the grid 82 and one transformer between the power converter 65 and the grid 82. In such embodiments, the transformer 84 is configured to provide three different voltages which may help to avoid the need for medium voltage rated resistive elements and/or a direct-inject (DI) switch. Windings of the rotor 80 (hereinafter referred as "rotor windings") are coupled to the power grid 82 via the power converter 65 and the first switch element 72. Further, the grid-side converter 70 is coupled to connection points between the first and second switch elements 72, 74.

Still referring to FIG. 4, the braking system 102 is provided in accordance with aspects of the present invention for protecting the generator 24 and the gearbox 36 during loss of electromagnetic (EM) torque (i.e. during an EM torque loss event) in the generator 24. More specifically, in certain embodiments, the EM torque loss events as described herein may include a grid loss and/or a power system trip or fault. Thus, as shown, the braking system 102 generally includes a main brake circuit 104, a mechanical brake 108 coupled to the main shaft 32, and a battery system 130. Further, the braking system 102 may be controller via a controller, such as the converter controller 75. In certain embodiments, the mechanical brake 108 includes at least one brake pad 110 which may be pressed onto a brake disc 112 to cause a friction between the brake pad 110 and the brake disc 112, such that the rotational speed of the main shaft 32 can be reduced or to inhibit a rotational movement of the main shaft 32. For example, the brake pad 110 may be mechanically pressed against the brake disc 112. Moreover, as shown, the main brake circuit 104 is coupled to the DC link 68.

In particular embodiments, the main brake circuit 104 includes at least one brake resistive element and at least one brake switch element. More specifically, as shown in FIG. 4, the main brake circuit 104 includes a rotor-side switching element 114, a rotor-side resistive element 116, and a storage element 118. Further, as shown, the rotor-side resistive element 116 and the storage element 118 are coupled to the DC link 68 using the rotor-side switch element 114. The rotor-side resistive element 116 may include a resistor, for example, or any power dumping device. The storage element 118 may include a battery, for example, or any energy storage device. In one embodiment, the battery may be a rechargeable battery. In another embodiment, the rotor-side switch element 114 may include a first DC chopper 120 and a second DC chopper 122. In such embodiments, the rotor-side resistive element 116 may be coupled to the DC link 68 using the first DC chopper 120, whereas the storage element 118 may be coupled to the DC link 68 using the second DC chopper 122.

Figure 6:
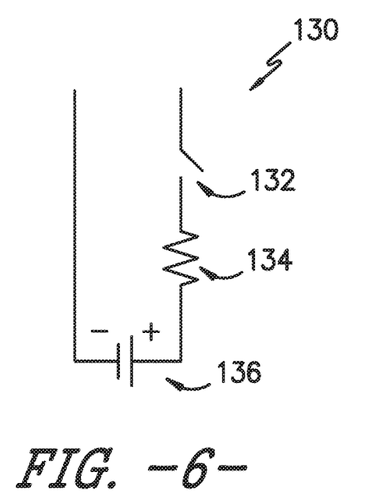
FIG. 6 illustrates a schematic diagram of one embodiment of a battery system according to the present disclosure.
Figure 7:
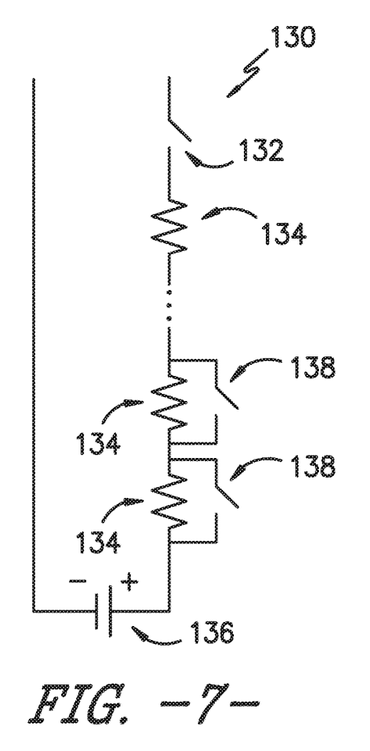
FIG. 7 illustrates a schematic diagram of another embodiment of a battery system according to the present disclosure.
Figure 8:
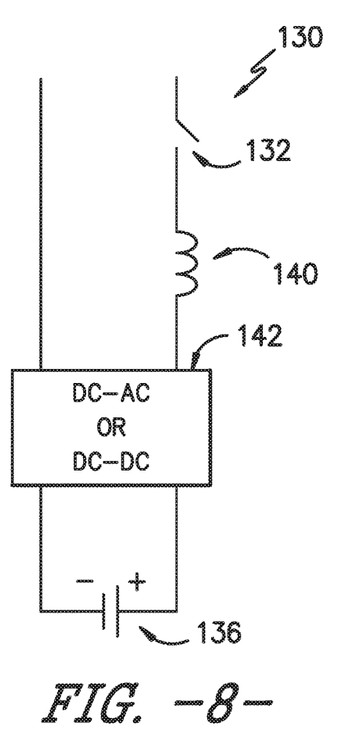
FIG. 8 illustrates a schematic diagram of yet another embodiment of a battery system according to the present disclosure.

The battery system 130 may be coupled to two phases or three phases of the rotor 80. Further, FIGS. 6-8 illustrate various schematic diagrams of multiple embodiments of the battery system 130. As shown, the battery system 130 may include a battery 130 coupled to the generator 24 via a battery switch element 132. Further, as shown in basic diagram of FIG. 6, the battery system 130 may include a battery resistive element 134. More specifically, the battery resistive element 134 may include a resistor or any other power dumping device. Further, the battery switch element 132 may include any suitable switching element such as, for example, a contactor. In further embodiments, as shown in FIG. 7, the battery system 130 may include a plurality of battery resistive elements 134, with one or more of the battery resistive elements 134 having a parallel contactor 138. Alternatively, as shown in FIG. 8, the battery system 130 may also include at least one inductor 140 as well as an additional bidirectional AC-DC or DC-DC converter 142. Thus, the embodiments of FIGS. 7 and 8 represent a battery system having controllability.

During normal operations of the wind turbine power system 100, the first and second switch elements 72, 74 are turned on. As such, if the generator 24 is operated in the super-synchronous mode, the windings of the stator 78 supply electric power to the power grid 82 via the first and second switch elements 72, 74 and the windings of the rotor 80 supply electric power to the power grid 82 via the power converter 65 and the first switch element 74. That is, the wind turbine 100 provides a highest output electric power. Alternatively, if the generator 24 is operated in the sub-synchronous mode, the windings of the stator 78 supply electric power to the power grid 82 via the first and second switch elements 72, 74 and the windings of the rotor 80 draw electric power from the power grid 82 via the first switch element 74 and the power converter 65. That is, the wind turbine 100 provides a reduced output electric power.

In the event of an EM torque loss event, however, the converter controller 75 is configured for controlling the first switch element 72 to decouple the power converter 65 and the generator 24 from the power grid 82. Moreover, the converter controller 75 is configured for controlling the second switch element 74 to couple the windings of the stator 78 to the power converter 65 and the generator 24 in response to the EM torque loss event, such that an output of electric power of the stator windings is transmitted to the rotor side resistive element 114 through the second switch element 74 and the grid-side converter 70 and is consumed by the rotor side resistive element 114. In addition, the converter controller 75 is configured to connect the main brake circuit 104 and/or the battery system 130 to the generator 24 in response to detecting an electromagnetic (EM) torque loss event so as to generate an EM torque.

In one embodiment, the loss of EM torque in the generator 24 may occur due to failure of the power converter 65, failure of the generator 24, opening of the second switch element 74, loss of stator voltage, grid loss event, etc. As a non-limiting example, a stator voltage sensor and a stator current sensor (not shown) can detect the grid loss event and, if the detected stator voltage and/or the detected stator current is greater or smaller than a predetermined value, the converter controller 75 is configured to determine that the grid loss event has occurred.

In additional embodiments, the converter controller 75 may be configured to determine whether the power system trip or fault is critical or non-critical. As used herein, a critical power system trip or fault generally corresponds to the power converter 65 being unavailable to use for braking, whereas a non-critical power system trip or fault generally corresponds to the power converter 65 being available to use for braking. As such, in certain embodiments, if the power converter 65 is available, the converter controller 75 is configured to activate the main brake circuit 104 and/or the battery system 130 to generate EM torque. More specifically, in one embodiment, the converter controller 75 is configured for controlling the rotor-side switch element 114 of the main brake circuit 104 to couple at least one of the rotor-side resistive element 116 and/or the storage element 118 to the DC link 68 for generating the EM torque in the generator 24 in response to the EM torque loss event, e.g. during a super-synchronous mode of the generator 24. In further embodiments, the converter controller 75 is configured for controlling the rotor-side switch element 114 to couple the storage element 118 to the DC link 68 for generating the EM torque in the generator 24 in response to the grid loss event during a sub-synchronous mode of the generator 24. In addition, the converter controller 75 may be configured to control the battery switch element 132 so as to connect the battery resistive element 134 to the generator 24 to generate the EM torque. As such, the main brake circuit 104 may be used alone or in conjunction with the battery system 130 to generate the EM torque. In contrast, if the power converter 65 is unavailable, the converter controller 75 is configured to control the battery switch element 132 so as to connect the battery resistive element 134 of the battery system 130 to the generator 24 to generate the EM torque, rather than using the main brake circuit 104 (which depends on converter availability).

After activating the main brake circuit 104 and/or the battery system 130, the converter controller 75 may further be configured to adjust one or more pitch angles of the rotor blades 22 to reduce the rotor speed. If the reduced rotor speed is greater than a threshold, the converter controller 75 is further configured to activate the mechanical brake 108 to shut down the wind turbine power system 100.

Figure 5:
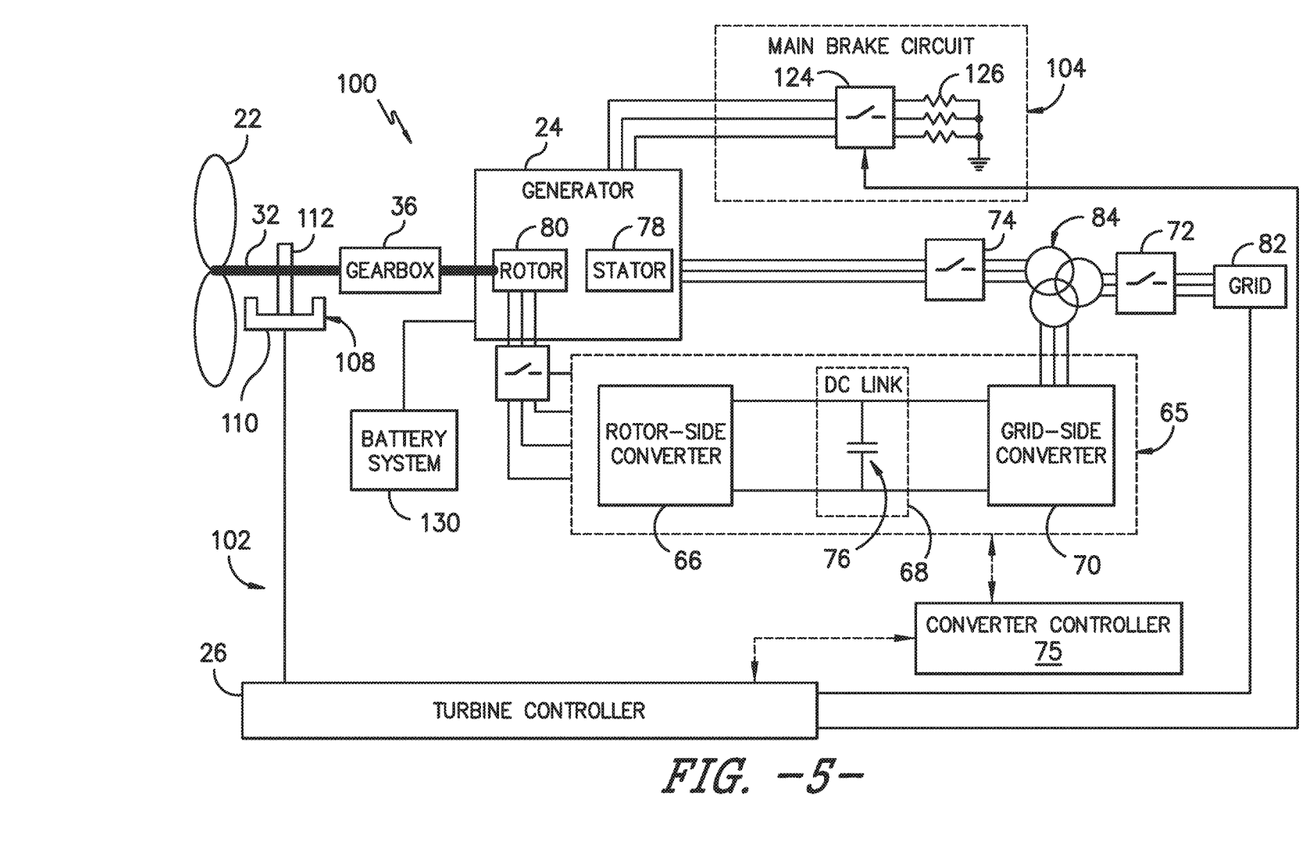
FIG. 5 illustrates a schematic representation of another embodiment of a wind turbine power system, particularly illustrating a braking system according to the present disclosure.

Referring now to FIG. 5, a schematic representation of another embodiment of the wind turbine power system 100 including the braking system 102 according to the present disclosure is illustrated. Further, as shown, the braking system 102 of FIG. 5 is configured similar to the embodiment of FIG. 4; except that that braking system 102 of FIG. 5 is coupled to the windings of the stator 78. In certain embodiments, it is understood by those skilled in the art that the main brake circuit 104 may be coupled to both the DC link 68 and the windings of the stator 78. Similar to FIG. 4, however, the battery system 130 may be coupled to the generator 24 via a battery switch element 132 and may include a battery resistive element 134. Further like the braking system 102 of FIG. 4, the converter controller 75 is configured for activating the main brake circuit 104 and/or the battery system 130 to generate the EM torque in the generator 24 in response to the loss of EM torque in the generator 24.

More specifically, as shown, the main brake circuit 104 includes stator-side switch elements 124 and stator side resistive elements 126. The stator-side resistive elements 126 are coupled between the stator-side switch elements 124 and ground. In other embodiments, the stator-side resistive elements 126 are coupled between the stator-side switch elements 124 and a predetermined potential. Each of the stator-side resistive elements 126 may include a resistor, for example, or any power damping device.

In such an embodiment, the converter controller 75 is configured to control the first switch element 72 to decouple the windings of the stator 78 and the power converter 65 from the power grid 82 in response to the EM torque loss event. In addition, the converter controller 75 is configured to control the stator-side switch elements 124 to couple the respective stator-side resistive elements 126 to the respective stator windings in response to the EM torque loss event, such that the windings of the stator 78 supplies electric power to the stator side resistive elements 126 via the stator side switch elements 124.

The converter controller 75 is further configured to control the second switch element 74 to couple the windings of the stator 78 to the power converter 65 in response to the EM torque loss event such that the windings of the rotor 80 supplies electric power to the stator side resistive elements 126 via the power converter 65, the second switch element 74, and the stator side switch elements 124 during the super-synchronous mode of the generator 24. Further, the windings of the rotor 80 draw current from the windings of the stator 78 via the power converter 65 and the second switch element 74 during the sub-synchronous mode of the generator 24. Therefore, the EM torque is also generated in the generator 24. In addition, the converter controller 75 is configured to connect the battery system 130 to the generator 24 in response to detecting an electromagnetic (EM) torque loss event so as to generate an EM torque.

In additional embodiments, the converter controller 75 may be configured to determine whether the power system trip or fault is critical or non-critical. As such, in certain embodiments, if the power converter 65 is available, the converter controller 75 is configured to activate the main brake circuit 104 and/or the battery system 130 to generate EM torque. More specifically, in one embodiment, the converter controller 75 is configured for controlling the rotor-side switch element 124 of the main brake circuit 104 to couple the resistive element(s) 126 to the DC link 68 for generating the EM torque in the generator 24 in response to the EM torque loss event, e.g. during a super-synchronous mode of the generator 24. In addition, the converter controller 75 may be configured to control the battery switch element 132 so as to connect the battery system 130 to the generator 24 to generate the EM torque. As such, the main brake circuit 104 may be used alone or in conjunction with the battery system 130 to generate the EM torque. In contrast, if the power converter 65 is unavailable, the converter controller 75 is configured to control the battery switch element 132 so as to connect the battery system 130 to the generator 24 to generate the EM torque, rather than using the main brake circuit 104.

As described above, the EM torque is regenerated in the generator 24 if the loss of EM torque in the generator 24 has occurred, but not reduced to zero immediately. As such, the braking system 102 of the present disclosure provides braking support that enables the wind turbine power system 100 to shut down in a much smoother manner, thereby reducing loads on the mechanical components of the wind turbine power system 100.

Figure 9:
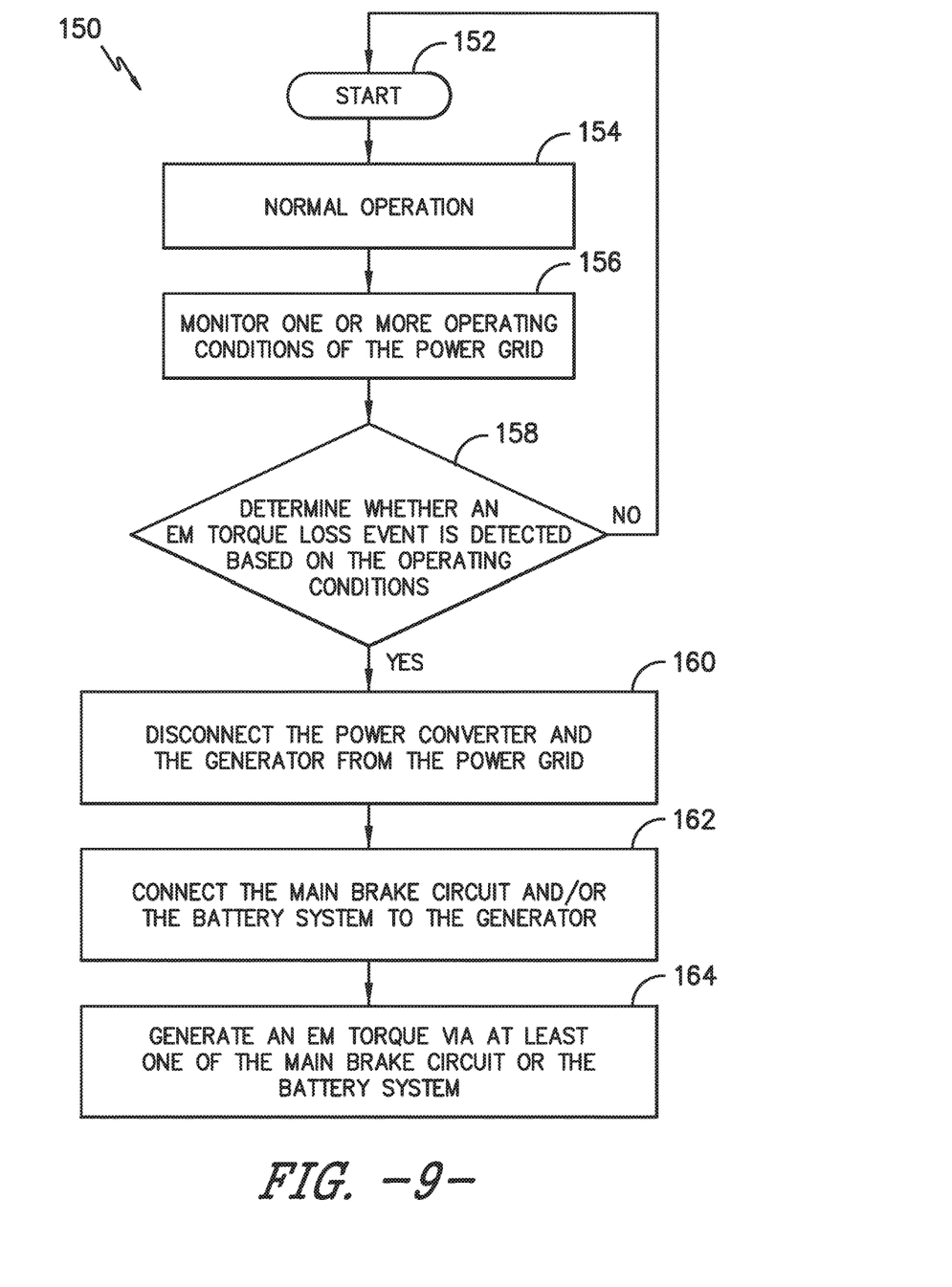
FIG. 9 illustrates a flow diagram of one embodiment of a method for protecting a wind turbine power system connected to a power grid according to the present disclosure.

Referring now to FIG. 9, a flow diagram of one embodiment of a method 150 for protecting a wind turbine power system 100 connected to a power grid 82, e.g. using the main brake circuit 104 and/or the battery system 130 as described herein, according to the present disclosure is illustrated. As shown, the method 150 starts at 152. As shown at 154, the wind turbine power system 100 is operated in a normal operational mode. As shown at 156, the method 150 includes monitoring, via one or more sensors (e.g. sensors 46, 48), one or more operating parameters of the power grid 82 that can be used by the converter controller 75 to determine whether an electromagnetic (EM) torque loss event is occurring. Thus, as shown at 158, the converter controller 75 (e.g. via one or more control algorithms stored therein) is configured to determine whether an EM torque loss event is occurring or has occurred based on the sensor data. If no EM torque loss event is detected, the method starts over at 152 (i.e. continues to monitor the power system 100). If an EM torque loss event is detected, as shown at 160 and 162, the method 150 includes disconnecting the power converter 65 and the generator 24 of the wind turbine power system 100 from the power grid 82 and connecting the main brake circuit 104 and the battery system 130 to the generator 24 of the wind turbine power system 100 so as to generate an EM torque. Further, as shown at 164, the method 150 also includes generating the EM torque via at least one of the main brake circuit 104 or the battery system 130 in response to detecting the EM torque loss event.

Figure 10:
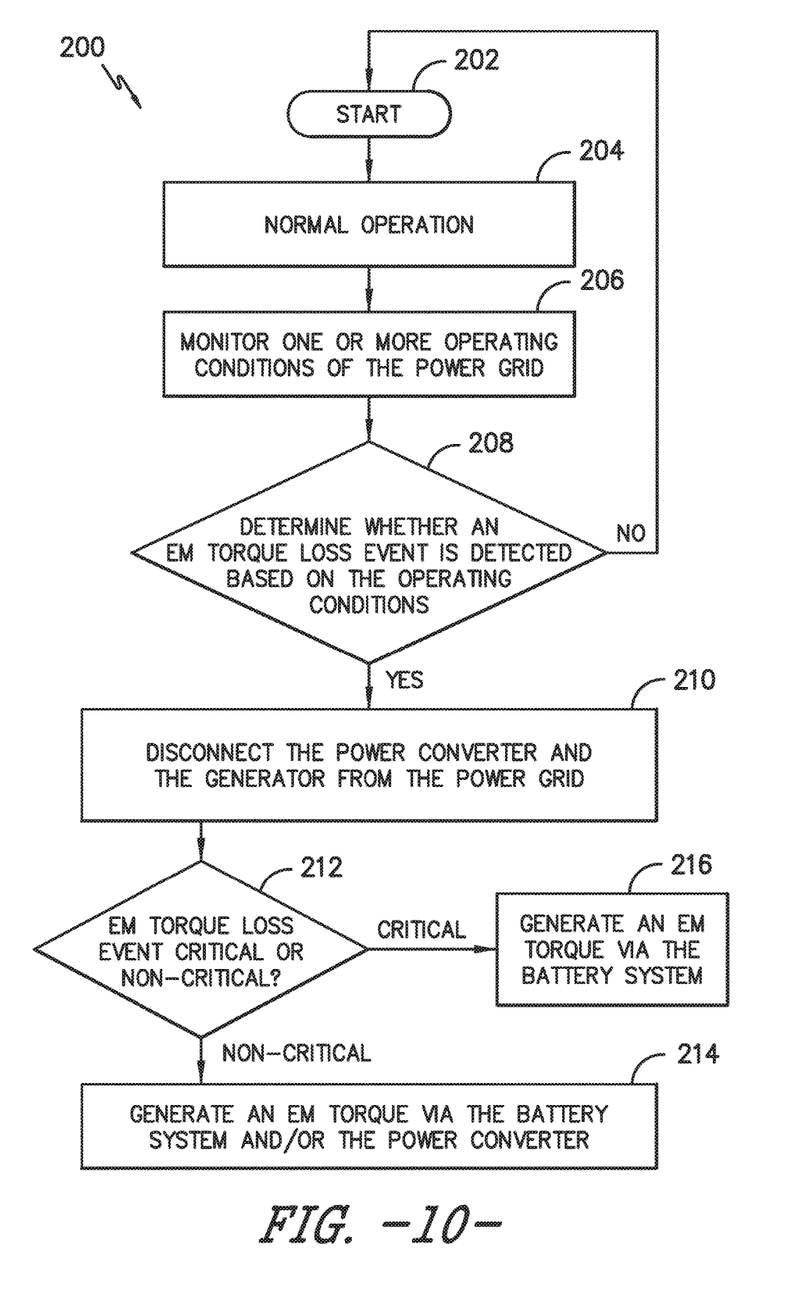
FIG. 10 illustrates a flow diagram of another embodiment of a method for protecting a wind turbine power system connected to a power grid according to the present disclosure.

Referring now to FIG. 10, a flow diagram of another embodiment of a method 200 for protecting a wind turbine power system 100 connected to a power grid 82, e.g. using the main brake circuit 104 and/or the battery system 130 as described herein, according to the present disclosure is illustrated. As shown, the method 200 starts at 202. As shown at 204, the wind turbine power system 100 is operated in a normal operational mode. As shown at 206, the method 200 includes monitoring, via one or more sensors (e.g. sensors 46, 48), one or more operating parameters of the power grid 82 that can be used by the converter controller 75 to determine whether an electromagnetic (EM) torque loss event is occurring. Thus, as shown at 208, the converter controller 75 (e.g. via one or more control algorithms stored therein) is configured to determine whether an EM torque loss event is occurring or has occurred based on the sensor data. If no EM torque loss event is detected, the method starts over at 202 (i.e. continues to monitor the power system 100). If an EM torque loss event is detected, as shown at 210, the method 200 includes disconnecting the power converter 65 and the generator 24 of the wind turbine power system 100 from the power grid 82. Further, as shown at 212, the method 100 includes determining whether the EM torque loss event is critical or non-critical. If non-critical (i.e. the power converter 65 is available), as shown at 214, the method 200 includes generating an EM torque via the battery system 130 and/or the power converter 65. If critical (i.e. the power converter 65 is unavailable), as shown at 216, the method 200 includes generating an EM torque via the battery system 130 alone.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A protection system for a wind turbine power system connected to a power grid, the wind turbine power system having a generator with a stator and a rotor and a power converter having a rotor-side converter electrically coupled to a grid-side converter via a DC link, the DC link having at least one DC link capacitor, the protection system comprising:
    a main brake circuit having at least one brake resistive element and at least one brake switch element, the brake resistive element electrically coupled to at least one of the DC link capacitor of the DC link of the power converter, windings of the rotor of the generator, or windings of the stator of the generator via the brake switch element;

a battery system separate from the power converter of the wind turbine power system and electrically coupled to one or more phases of the rotor of the generator via a battery switch element, the battery system comprising a battery resistive element, which comprises a resistor and a parallel contactor; and, a controller configured to disconnect the power converter and the generator from the power grid and connect at least one of the main brake circuit or the battery system to the generator in response to detecting an electromagnetic (EM) torque loss event in the power grid so as to generate an EM torque.

2. The protection system of claim 1, further comprising a first switch element coupled between the power converter and the generator and the power grid.

3. The protection system of claim 2, wherein the controller is further configured to disconnect the power converter and the generator from the power grid via the first switch element.

4. The protection system of claim 1, wherein the EM torque loss event comprises at least one of a grid loss or a power system trip or fault.

5. The protection system of claim 4, wherein the controller is further configured to determine whether the power system trip or fault is critical or non-critical.

6. The protection system of claim 5, wherein a critical power system trip or fault corresponds to the power converter being unavailable to use for braking and a non-critical power system trip or fault corresponds to the power converter being available to use for braking.

7. The protection system of claim 6, wherein, if the power converter is available, the controller is configured to control the brake switch element of the main brake circuit so as to connect the brake resistive element to the generator to generate the EM torque.

8. The protection system of claim 6, wherein, if the power converter is unavailable, the controller is configured to control the battery switch element of the battery system so as to connect the battery resistive element to the generator to generate the EM torque.

9. The protection system of claim 1, further comprising a storage element, wherein the controller is further configured to control the brake switch element so as to connect at least one of the brake resistive element or the storage element to the DC link in response to the EM torque loss event.

10. The protection system of claim 9, wherein the brake switch element comprises a first DC chopper coupled to the storage element and the DC link and a second DC chopper coupled to the brake resistive element and the DC link.

11. The protection system of claim 1, further comprising a second switch element, wherein the controller is further configured to control the second switch element so as to decouple the windings of the stator from the grid-side converter and couple the brake resistive element to the windings of the stator in response to the EM torque loss event control.

12. A method for protecting a wind turbine power system connected to a power grid, the wind turbine power system having a generator with a stator and a rotor and a power converter having a rotor-side converter, a grid-side converter, and a DC link configured therebetween, the method comprising:

monitoring, via one or more sensors, one or more operating conditions of the power grid;

determining, via a controller, whether an electromagnetic (EM) torque loss event is occurring in the power grid based on the one or more operating conditions;

in response to detecting the EM torque loss event, disconnecting, via the controller, the power converter and the generator from the power grid and connecting a main brake circuit and a battery system to the generator so as to generate an EM torque, the battery system separate from the power converter of the wind turbine power system and electrically coupled to one or more phases of the rotor of the generator via a battery switch element, the battery system comprising a battery resistive element, which comprises a resistor and a parallel contactor; and, generating the EM torque via at least one of the main brake circuit or the battery system.

13. The method of claim 12, wherein the EM torque loss event comprises at least one of a grid loss or a power system trip or fault.

14. The method of claim 13, further comprising determining whether the power system trip or fault is critical or non-critical.

15. The method of claim 14, wherein, if the power system trip or fault is critical, the method comprises generating the EM torque via the battery system, and if the power system trip or fault is non-critical, the method comprises generating the EM torque via the main brake circuit.

16. The method of claim 14, wherein, if the power system trip or fault is critical, the method comprises generating the EM torque via the battery system, and if the power system trip or fault is non-critical, the method comprises generating the EM torque by pivoting between the main brake circuit and the battery system.

17. The method of claim 12, further comprising controlling the main brake circuit via a brake switch element thereof so as to connect at least one of a brake resistive element or a storage element of the main brake circuit to the DC link in response to the EM torque loss event.

18. The method of claim 12, further comprising controlling a second switch element so as to decouple windings of the stator from the grid-side converter and couple a brake resistive element or the battery resistive element to the windings of the stator in response to the EM torque loss event control.

19. A method for protecting a wind turbine power system connected to a power grid, the wind turbine power system having a generator with a stator and a rotor and a power converter having a rotor-side converter, a grid-side converter, and a DC link configured therebetween, the method comprising:

monitoring, via one or more sensors, one or more operating conditions of the power grid;

determining, via a controller, whether an electromagnetic (EM) torque loss event is occurring in the power grid based on the one or more operating conditions; and, in response to detecting the EM torque loss event, disconnecting the power converter and the generator from the power grid and generating an EM torque via a main brake circuit and a battery system depending on her the EM torque loss event is critical or non-critical, the battery system separate from the power converter of the wind turbine power system and electrically coupled to one or more phases of the rotor of the generator via a battery switch element, the battery system comprising a battery resistive element, which comprises a resistor and a parallel contactor.

20. The method of claim 19, wherein the EM torque loss event comprises at least one of a grid loss or a power system trip or fault.

* * * * *